United States Patent
Hassan et al.

(10) Patent No.: US 10,302,870 B2
(45) Date of Patent: May 28, 2019

(54) OPTICAL COUPLING DEVICE FOR A PHOTONIC CIRCUIT

(71) Applicant: COMMISSARIAT A L'ENERGIE ATOMIQUE ET AUX ENERGIES ALTERNATIVES, Paris (FR)

(72) Inventors: Karim Hassan, Moneteau (FR); Salim Boutami, Grenoble (FR); Sylvie Menezo, Voiron (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/141,414

(22) Filed: Sep. 25, 2018

(65) Prior Publication Data
US 2019/0094467 A1     Mar. 28, 2019

(30) Foreign Application Priority Data

Sep. 26, 2017   (FR) ..................... 17 58885

(51) Int. Cl.
*G02B 6/30*     (2006.01)
*G02B 6/136*    (2006.01)
(Continued)

(52) U.S. Cl.
CPC ............ *G02B 6/305* (2013.01); *G02B 6/124* (2013.01); *G02B 6/1228* (2013.01); *G02B 6/136* (2013.01);
(Continued)

(58) Field of Classification Search
None
See application file for complete search history.

(56) References Cited

U.S. PATENT DOCUMENTS 6,285,813 B1 *   9/2001   Schultz ................. G02B 6/124
                                                         359/575
9,645,320 B2 *   5/2017   Zhang ...................... G02B 6/34
(Continued)

FOREIGN PATENT DOCUMENTS

FR          3 027 689 A1     4/2016

OTHER PUBLICATIONS

French Preliminary Search Report dated Jul. 10, 2018 in French Application 17 58885 filed on Sep. 26, 2017 (with English Translation of Categories of Cited Documents).
(Continued)

*Primary Examiner* — Michael Stahl
(74) *Attorney, Agent, or Firm* — Oblon, McClelland, Maier & Neustadt, L.L.P.

(57) ABSTRACT

A coupling device including, integrated in or on a substrate, a waveguide capable of guiding a light beam centered on a central wavelength $\lambda_0$ and an optical coupler. The waveguide and the optical coupler extend in two superposed stages of the coupling device. The optical coupler is composed of at least one index gradient structure. The average optical index in the index gradient structure varies monotonously, decreasing with increasing distance from the waveguide, the average optical index being an average value of the optical index in a cubic volume with a side dimension equal to:

$$\frac{\lambda_0}{2 * n_{\it eff}}$$

in which $n_{\it eff}$ is the effective index of guided mode in the waveguide.

15 Claims, 5 Drawing Sheets

(51) Int. Cl.
*G02B 6/122* (2006.01)
*G02B 6/124* (2006.01)
*G02B 6/12* (2006.01)

(52) U.S. Cl.
CPC ...... *G02B 6/30* (2013.01); *G02B 2006/12097* (2013.01)

(56) References Cited

U.S. PATENT DOCUMENTS

| | | | | |
|---|---|---|---|---|
| 9,766,398 | B2* | 9/2017 | Kong | G02B 6/124 |
| 9,897,754 | B2* | 2/2018 | Zhou | G02B 6/122 |
| 2004/0156589 | A1 | 8/2004 | Gunn, III et al. | |
| 2007/0071389 | A1* | 3/2007 | Yoon | G02B 6/02066 |
| | | | | 385/37 |
| 2009/0046979 | A1* | 2/2009 | Zhou | G02B 6/32 |
| | | | | 385/43 |
| 2013/0039620 | A1* | 2/2013 | Ho | G02B 6/124 |
| | | | | 385/33 |
| 2014/0314374 | A1 | 10/2014 | Fattal et al. | |
| 2015/0117808 | A1* | 4/2015 | Chen | G02B 6/30 |
| | | | | 385/2 |
| 2015/0285996 | A1* | 10/2015 | Selvaraja | G02B 6/30 |
| | | | | 385/14 |
| 2016/0109659 | A1* | 4/2016 | Jiang | G02B 6/305 |
| | | | | 385/14 |
| 2016/0116680 | A1* | 4/2016 | Ling | G02B 5/1809 |
| | | | | 385/1 |
| 2017/0123160 | A1* | 5/2017 | Kato | G02B 6/26 |

OTHER PUBLICATIONS

Taillaert, D. et al., "Grating Couplers for Coupling between Optical Fibers and Nanophotonic Waveguides", Japanese Journal of Applied Physics, vol. 45, No. 8A, 2006, pp. 8.

* cited by examiner

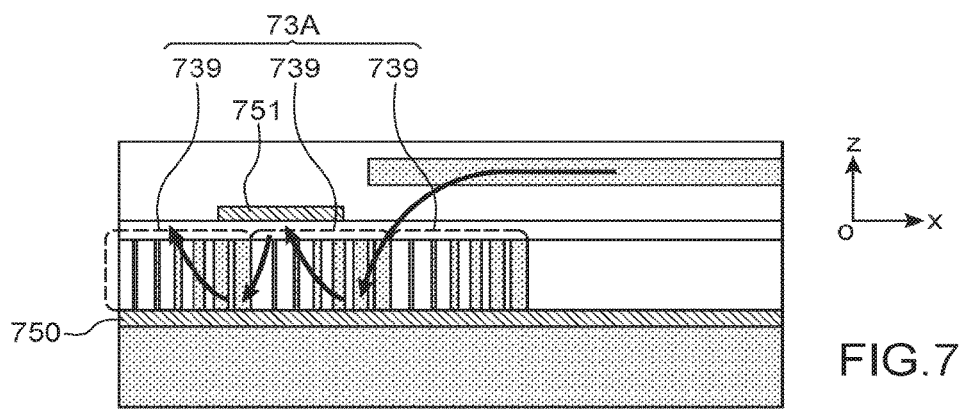
FIG.7
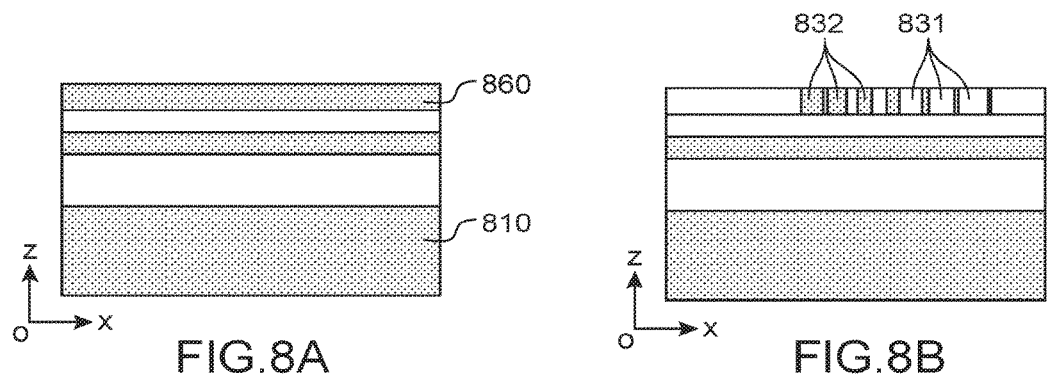
FIG.8A
FIG.8B
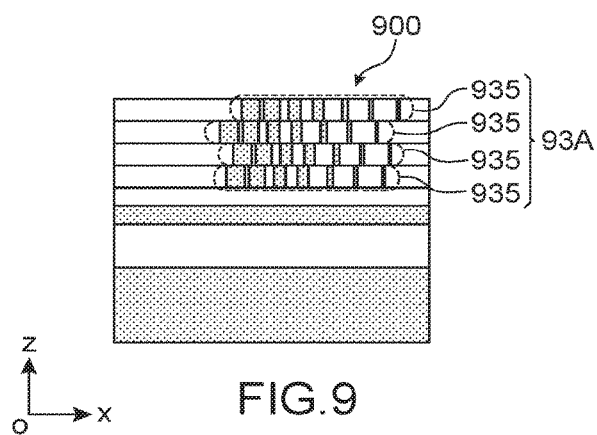
FIG.9

OPTICAL COUPLING DEVICE FOR A PHOTONIC CIRCUIT

TECHNICAL DOMAIN

The invention relates to the domain of injection and/or extraction of light, in and/or towards a waveguide integrated into or onto a substrate.

The invention relates particularly to optical coupling between a photonic circuit and an optical fibre.

STATE OF PRIOR ART

Optical coupling between an optical fibre and a waveguide integrated on a substrate classically uses a diffraction grating.

The paper by Dirk Taillaert & al., "*Grating Couplers for Coupling between Optical Fibers and Nanophotonic Waveguides*", Japanese Journal of Applied Physics, Vol. 45, No. 8A, 2006, pp. 6071-6077, describes one example embodiment of such optical coupling.

This paper describes a silicon structure with constant thickness that comprises a 12 μm wide pad, a taper with decreasing width and a nanophotonic waveguide juxtaposed one after the other.

The diffraction grating is etched in the wide pad.

The diffraction grating extends over a depth of about 70 nm, into the thickness of the pad, and has a period $\Lambda=\lambda/n_{eff}$, in which $\lambda$ is the coupling wavelength and $n_{eff}$ is the effective index of the guided mode in the waveguide.

The diffraction grating extracts light outside the plane of the silicon structure, in a direction of coherent constructive interference that depends on the wavelength. Light thus extracted is injected into an optical fibre oriented approximately normal to the substrate. A reflector reflects towards the optical fibre part of the light extracted towards the inner half-space.

The paper also provides information about how to slightly mismatch the diffraction grating to eliminate second order diffraction (apodization) generating reflection. In particular, the paper illustrates a diffraction grating with grooves that become increasingly wide as the distance from the waveguide reduces.

Such a structure can achieve a passband at 1 dB of 40 nm.

One purpose of this invention is to increase the width of the passband of coupling between a waveguide integrated into or onto a substrate, and an external element such as an optical fibre.

PRESENTATION OF THE INVENTION

This objective is achieved with a coupling device comprising a substrate (110) in or on which the following are integrated:
  a waveguide capable of guiding a light beam centred on a central wavelength $\lambda_0$; and
  an optical injection and/or extraction coupler.

According to the invention, the coupling device comprises a guide stage comprising the waveguide and a coupling stage comprising the optical coupler, superposed.

The optical coupler is composed of at least one index gradient structure.

The average optical index in the index gradient structure varies monotonously, decreasing in planes parallel to the plane of the substrate, as the distance from the waveguide increases.

The average optical index is defined as being an average value of the optical index in a cubic volume with a side dimension equal to:

$$\frac{\lambda_0}{2*n_{eff}}$$

in which $n_{eff}$ is the effective index of guided mode in the waveguide;
said average value being a root mean square of the optical indexes of materials forming said cubic volume, weighted by the volume proportion of each of these materials in the cubic volume.

The optical coupler according to the invention makes an outside the plane coupling. In other words, during use, it can deviate the propagation axis of a light beam to inject it in a plane parallel to the substrate and/or to extract it from a plane parallel to the substrate. The light beam is usually injected into and/or extracted from the waveguide.

Throughout this text, the plane of the substrate designates a plane parallel to a lower face or an upper face of the substrate.

Since the optical coupler cooperates with the waveguide, it will be understood that it can couple a light beam centred on the same central wavelength $\lambda_0$.

According to the invention, the optical coupler is not formed directly in the guide stage comprising the waveguide. Rather, it is formed in a coupling stage distinct from the guide stage. The coupling stage and the guide stage are superposed along an axis orthogonal to the plane of the substrate.

Also according to the invention, the optical coupler comprises at least one index gradient structure.

During operation, a light beam centred on the wavelength $\lambda_0$ circulates in the index gradient structure following an optical path parallel to the longitudinal axis of the waveguide. The light beam then follows a succession of cubic volumes as defined above, in turn.

According to the invention, an average optical index of a cubic volume is defined as being a root mean square of the optical indexes of the materials from which this cubic volume is composed. Since the dimensions of the cube are particularly small, light inside the cube is only sensitive to this average optical index.

The variation of the average optical index in the index gradient structure can thus deviate the light beam circulating in the index gradient structure, and thus achieve the required optical coupling.

In other words, according to the invention, deviation of the beam at the origin of optical coupling does not make use of diffraction phenomena, but rather a beam deviation phenomenon by progressive modification of a local optical index value.

The inventors have demonstrated that the optical coupling device according to the invention can access larger spectral coupling widths than is possible in prior art.

Furthermore, the beam deviation principle used in the invention can make coupling with an optical fibre located above the coupling device more efficient, particularly when the optical fibre is oriented along an axis normal to the plane of the substrate.

Indeed, with a diffraction grating according to prior art, light at normal incidence injected into the coupling device is equitably distributed along two optical paths in opposite directions, only one of them leading to the waveguide. On the other hand, in the invention, the asymmetric structure makes it possible for light at normal incidence injected into the coupling device to be coupled in only one direction.

This is an advantageous effect since the optical fibre can be aligned along the normal to the substrate with better alignment precision that with an alignment along an axis inclined relative to this normal. This alignment precision improves control of centring of a coupled spectral band.

Finally, the beam deviation principle used in the invention can extract light to a single half-space, outside the optical coupling device according to the invention. This avoids the need for a reflecting mirror.

Advantageously, the apparent thickness of the at least one index gradient structure (optical coupler) of the coupling device according to the invention is more than or equal to $\lambda_0/n_{eff}$, the apparent thickness being defined along an axis orthogonal to the plane of the substrate and designating a cumulated thickness through which the light beam passes, wherein said light beam comes from the waveguide or arrives into the waveguide, and said light beam being centred on the central wavelength $\lambda_0$.

To achieve this, the (real) thickness of the optical coupler may be more than or equal to $\lambda_0/n_{eff}$, the thickness being defined along an axis orthogonal to the plane of the $n_{eff}$ substrate.

Additionally or as a variant, the coupling device according to the invention may comprise at least one reflector, positioned facing the optical coupler so as to increase the apparent thickness of the optical coupler. The real thickness of the optical coupler can thus be much less than $\lambda_0/n_{eff}$, while having an optical thickness more than or equal to $\lambda_0/n_{eff}$.

In particular, the coupling device according to the invention may also comprise a first reflector, located on the side of the optical coupler opposite the guide stage.

Additionally, the coupling device according to the invention may also comprise a second reflector, located on the same side of the optical coupler as the guide stage.

The coupling device according to the invention can also have one or more of the characteristics defined in the dependent claims for the device.

The invention also relates to a method of fabricating a coupling device according to the invention, in which the at least one index gradient structure is made using several successive cycles as follows:
  deposit a support layer;
  etch through openings in the support layer; then
  fill the etched openings with an infill material and planarize.

BRIEF DESCRIPTION OF THE DRAWINGS

This invention will be better understood after reading the description of example embodiments given purely for information and that are in no way limitative, with reference to the appended drawings on which:

FIGS. 6 and 7 diagrammatically illustrate a fourth and a fifth embodiment of a coupling device according to the invention;

FIGS. 8A and 8B diagrammatically illustrate a method of fabricating a coupling device according to the invention;

FIG. 9 illustrates the coupling device obtained using the method illustrated in FIGS. 8A and 8B.

DETAILED PRESENTATION OF PARTICULAR EMBODIMENTS

The axes of an orthonormal coordinate system (Oxyz) are shown on the figures.

Throughout the text, the thickness denotes the dimension along the (Oz) axis, the width denotes the dimension along the (Oy) axis, and the length denotes the dimension along the (Ox) axis.

Figure 1A:
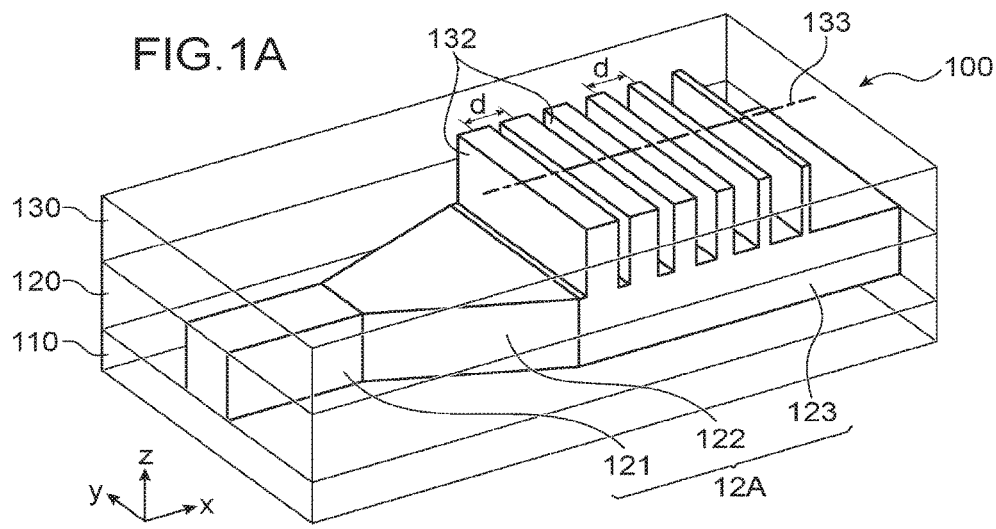
FIGS. 1A to 1C diagrammatically illustrate a first embodiment of a coupling device according to the invention.
Figure 1B:
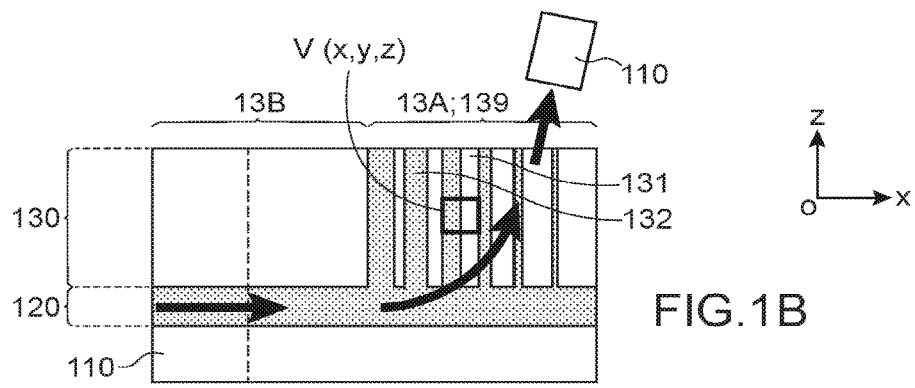
Figure 1C:
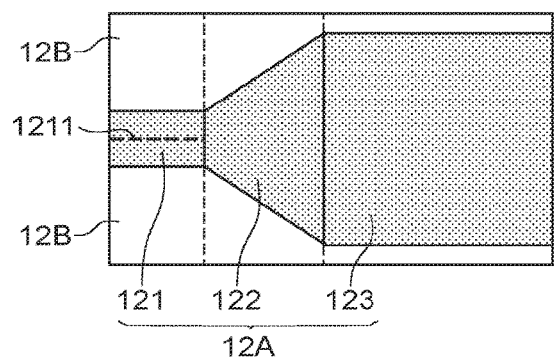

FIGS. 1A, 1B and 1C diagrammatically illustrate a first embodiment of the coupling device 100 according to the invention in a perspective view, a sectional view in the (xOz) plane, and in a sectional view in the (xOy) plane respectively.

The coupling device according to the invention comprises a substrate 110, delimited in the vertical direction by an upper face 110A and a lower face 110B, parallel to the (xOy) plane. In this case, the upper face 110A and the lower face 110B form the largest faces of the substrate 110.

In this case, the substrate 110 is in the form of a rectangular parallelepiped.

In this case it is composed of silica ($SiO_2$).

The coupling device 100 also comprises a guide stage 120, and a coupling stage 130.

The substrate 110, the guide stage 120 and the coupling stage 130 are superposed together along the (Oz) axis, orthogonal to the (xOy) plane. In this case, the guide stage 120 is arranged between the substrate 110 and the coupling stage 130. In this case, the guide stage 120 extends in direct physical contact with the coupling stage 130.

The guide stage 120 is delimited in the vertical direction by two faces parallel to the (xOy) plane.

The guide stage 120 comprises a structure 12A, delimited in the vertical direction by two faces parallel to the (xOy) plane, and with the same thickness as the guide stage 120.

The structure 12A, called a high index structure, comprises a waveguide 121 of the nanophotonic waveguide type, a taper 122 and a pad 123, juxtaposed one after the other along the (Ox) axis (see FIGS. 1A and 1C).

In this case, the "waveguide" refers only to the high index core region of the waveguide.

The waveguide 121 is adapted to guide a light beam centred on a central wavelength $\lambda_0$.

In this case it has a constant square or rectangular cross-section in planes parallel to (yOz).

Its largest dimension is parallel to the (Ox) axis, and defines its longitudinal axis 1211. The longitudinal axis 1211 corresponds to the direction of light propagation in the waveguide 121.

It is not impossible that the waveguide 121 forms a portion of a longer waveguide.

The pad 123 is much wider than the waveguide 121.

For example, the width of the pad 123 may be more than 10 μm, while the width of the waveguide 121 is less than or equal to 1 μm.

In this case, the pad 123 is advantageously but optionally composed of the same material as the waveguide 121.

The taper 122, or adapter, is located between the waveguide 121 and the pad 123, in direct physical contact with each other. It is an adiabatic taper.

The taper 122 is advantageously but optionally composed of the same material as the waveguide 121.

Its width decreases with increasing distance along the (Ox) axis, from a first end of the pad 123 to a second end on the side of the waveguide 121. Preferably, its width decreases from a width equal to the width of the pad 123, to a width equal to the width of the waveguide 121.

The pad 123 and the taper 123 together perform an adiabatic mode adaptation of guided mode in the waveguide. These elements are known in prior art.

In this case, the structure 12A is composed of silicon (Si).

In the guide stage 120, the structure 12A is framed by two low index regions 12B with an optical index less than that of the structure 12A (or possibly less than the optical indexes of the waveguide 121, the taper 122 and the pad 123 respectively).

Throughout this text, the optical indexes are defined at the wavelength $\lambda_0$.

Preferably, the low index regions 12B are composed of the same material as the layer directly adjacent to the guide stage, on the side opposite the coupling stage (in this case the substrate 110).

In this case, the two low index regions 12B are composed of silica.

To facilitate understanding of the invention, the two low index regions 12B are shown transparent in FIG. 1A.

According to variants not shown, the low index regions 12B may comprise different zones composed of different materials, or even cavities containing a vacuum or a gas.

We will now describe the coupling stage 130.

The coupling stage 130 is delimited in the vertical direction by two faces parallel to the (xOy) plane.

The coupling stage 130 includes an optical coupler 13A.

The optical coupler 13A is delimited in the vertical direction by two faces parallel to the (xOy) plane, and extends in the vertical direction over the entire thickness of the coupling stage 130.

The optical coupler 13A can make optical injection and/or extraction coupling to and/or from the waveguide. Injection denotes injection of a light beam into a plane parallel to the (xOy) plane, more particularly in the waveguide 121, in this case through the pad 123 and the taper 122. Extraction denotes extraction of a light beam from a plane parallel to the (xOy) plane, more particularly outside the waveguide 121, in this case through the taper 122 and the pad 123.

In this case, the optical coupler 13A is composed of an index gradient structure 139, in this case composed of an alternation of first regions 131 and second regions 132 along an axis parallel to (Ox) (see FIGS. 1A and 1B).

In this case, the first and second regions 131, 132 extend each over the entire width of the index gradient structure 139.

The first regions 131 entirely fill the spaces between the second regions.

The optical index of the first regions 131 is less than that of the second regions 132.

Preferably, the optical index of the second regions is similar to that of the structure 12A of the guide stage, for example within 20%.

The second regions 132 may be composed of the same material as the structure 12A of the guide stage, in this case silicon.

As a variant, they may be composed of a different material. For example, the structure 12A is made of silicon and the second regions 132 are made of amorphous silicon.

The first regions 131 are preferably composed of the same material as the low index regions 12B of the guide stage, in this case silica.

The first regions 131 in FIG. 1A are shown transparent, to make it easier to understand the figure.

The remaining part of the coupling stage 130 is filled with a low index layer 13B, with an optical index lower than that of the structure 12A. The low index layer 13B is advantageously composed of the same material as the low index regions 12B of the guide stage, in this case silica.

The waveguide 121 is thus entirely surrounded by a material with lower index acting as a cladding. In particular, in this case the substrate 110 forms a lower cladding for the waveguide 121, the low index regions 12B form lateral claddings and the low index layer 13B forms an upper cladding. In this case, the waveguide 121 is made of silicon surrounded by silica. It is adapted to guidance of a light beam centred on a wavelength $\lambda_0$=1550 nm.

We will now describe the index gradient structure 139 in detail.

In this case, the index gradient structure 139 is superposed on the pad 123 of the guide stage, along an axis parallel to (Oz). In this case it extends in physical contact with the pad 123.

It is in the shape of a rectangular parallelepiped, delimited in the vertical direction by two faces parallel to the (xOy) planes. It is preferably the same width as the pad 123, along the (Oy) axis. In this case it extends over the entire length of the pad 123, along the (Ox) axis.

In this case, the second regions 132 are in the shape of rectangular parallelepipeds, each of which extends over the entire width of the index gradient structure. Their largest faces extend in planes parallel to (yOz), and are called the "entry and exit faces". Therefore the entry and exit faces are orthogonal to the longitudinal axis of the waveguide.

In this case, each of the first and second regions extends over the entire thickness of the guide stage, along the (Oz) axis. Therefore the index gradient structure 139 is invariable along this axis (Oz).

A centre-to-centre distance between two directly neighbouring second regions 132 throughout the index gradient structure 139 is denoted d.

This distance d is defined along an axis 133 parallel to the longitudinal axis of the waveguide 121, parallel to the (Ox) axis.

This distance d satisfies:

$$d \leq \frac{\lambda_0}{2 * n_{\mathit{eff}}} \quad (1)$$

in which $n_{\mathit{eff}}$ is the effective index of guided mode in the waveguide 121, in operation, and $\lambda_0$ is the central wavelength that the waveguide 121 can guide.

As a reminder, the effective index of a guided mode in a waveguide, is defined as follows:

$$n_{\mathit{eff}} = \beta * \frac{\lambda_0}{2\pi} \quad (2)$$

in which $\lambda_0$ is the central wavelength of the light beam propagating in the waveguide and $\beta$ is the phase constant of the waveguide.

$\beta$ depends on the wavelength and the mode of the light beam propagating in the waveguide, and the properties of this waveguide (particularly refraction indexes and geometry).

$\beta$ is defined by: $A(x)=A(0)\exp(\gamma x)$, in which x is an abscissa along a propagation path in the waveguide, $A(x)$ is the complex amplitude as a function of x of a light beam propagating in the waveguide, and $\beta$ is the imaginary part of $\gamma$.

It can sometimes be considered that the effective index designates the average optical index of the medium as it is "seen" by a mode of the light beam propagating in the waveguide. Consequently, in practice, equation (1) can be approximated as follows:

$$d \leq \frac{\lambda_0}{2 * n_c} \quad (3)$$

in which $n_c$ is the optical index of the waveguide 121.

In practice, the distance d is at least less than half the wavelength $\lambda_0$, and preferably less than or equal to one quarter of $\lambda_0$.

In this case, the distance d remains constant throughout the index gradient structure 139.

On the other hand, the lengths of the second regions 132 vary along the axis 133 parallel to (Ox).

The index gradient structure 139 thus forms a pseudo-periodic structure with pitch d.

The length of the second regions 132 varies monotonously decreasing along the axis 133, with increasing distance from the waveguide 121.

In a complementary manner, the length of the first regions 131 varies monotonously increasing along the axis 133, with increasing distance from the waveguide 121.

In other words, the ratio between the length of a second region 132, firstly, and the sum of the lengths of said second region and an adjacent first region 131, secondly, varies monotonously decreasing as the distance from the waveguide increases, along the axis 133. For example, among the two first regions 131 adjacent to a second region 132, the first region 131 the furthest from the waveguide 121 will be considered.

Said ratio can also be defined as a ratio between the length of a second region and the length of a pseudo-period of the index gradient structure.

Preferably, the monotonous variation is also linear.

During operation, a light beam centred on the wavelength $\lambda_0$ circulates in the index gradient structure 139, successively passing through the first and second regions.

This light beam is oriented along the direction of a vector, of which one of the components is parallel to the (Ox) axis.

The consequence of the condition on the distance d is that this light beam at $\lambda_0$ is not diffracted by sudden index changes. It only "sees" local values of an average optical index.

Each local value of the average optical index is defined in a cubic volume $V(x,y,z)$ with side equal to $$\frac{\lambda_0}{2 * n_{eff}},$$

centred on a point with coordinates (x,y,z) in the index gradient structure. Therefore at each point on the optical path of the light beam in the index gradient structure, there is a corresponding specific value of the average optical index seen by the light beam.

The average optical index $n_{moy}$ in the cubic volume $V(x,y,z)$ is equal to:

$$n_{moy} = \sqrt{f_{n1} * n_1^2 + (1 - f_{n1}) * n_2^2} \quad (4)$$

in which $f_{n1}$ is the proportion of material in the first regions in said cubic volume (between 0 and 1), $n_1$ is the optical index of the first regions, and $n_2$ is the optical index of second regions of the index gradient structure.

During operation, light from the waveguide 121 will leak to the index gradient structure 139, which has an optical index similar to that of the waveguide, on the same side as the waveguide.

Light then propagates in the index gradient structure 139 along an optical path with a component along the (Ox) axis and a component along the (Oy) axis.

The length of the second regions 132 varies monotonously decreasing along the axis 133, with increasing distance from the waveguide.

Consequently, the proportion of material of the second regions 132 in a cubic volume $V(x,y,z)$ varies monotonously decreasing with increasing distance from the waveguide, along the axis 133.

Consequently, the average optical index in a cubic volume $V(x,y,z)$ also varies monotonously decreasing with increasing distance from the waveguide, along the axis 133. This index gradient deviates light by curving it, the wave front being slowed down on the side of the waveguide, in the index gradient structure. In particular, the local slope of a light beam propagating in the structure 139 varies progressively along the axis 133.

Obviously, the same condition is satisfied, along each axis parallel to the axis 133, passing through the index gradient structure, and on which a series of cubic volumes $V(x,y,z)$ with side dimension equal to $$\frac{\lambda_0}{2 * n_{eff}}$$

can be centred.

Therefore the same condition is satisfied along each axis corresponding to the orthogonal projection in an (xOy) plane parallel to the plane of the substrate, of one of the rays of the beam propagating in the index gradient structure.

The deviation of light in the index gradient structure increases with the value of said gradient, and with the thickness of said structure. These two parameters can be used to adjust the extraction direction of light, for example to adapt it to the orientation of an optical fibre above the index gradient structure.

During injection, rays follow the same path in the opposite direction, such that the advantages of the invention are equally applicable for injection and for extraction of light.

FIG. 1B diagrammatically shows the extraction path of a light beam outside the coupling device 100, in this case to an optical fibre 110.

In this case, the optical fibre 110 extends along an axis approximately normal to the plane of the substrate, in other words normal to the (xOy) plane. It is advantageously inclined by a few degrees from the normal to the plane of the substrate, for example less than 10°.

However, the invention is not limited to such an orientation of the optical fibre, which can extend above the substrate, being more inclined relative to the normal to the plane of the substrate. This relaxes constraints on the index gradient in the index gradient structure, and on the thickness of said structure.

The coupling device 100 limits spectral dispersion related to injection and/or extraction, in comparison with optical couplers according to prior art. In particular, an extraction angle remains constant over a 200 nm wide spectral band. This low spectral dispersion has a special interest particularly in the field of optical telecommunications, in which it is required to code information on several wavelengths. In particular, the invention makes it possible to receive and/or inject different wavelengths.

The coupling device 100 also provides coupling insensitive to polarisation.

Finally, the coupling device 100 does not impose the addition of a reflector to extract light in a single half-space.

The low spectral dispersion observed by the inventors can be explained as follows.

The light deviation angle at the entry into the index gradient structure 139 from the guide stage is denoted $\alpha(\lambda)$. We have $$\alpha(\lambda) = \tan^{-1}\left(\sqrt{\frac{n_c^2}{n_{\it eff}^2(\lambda)} - 1}\right),$$

where $n_c$ is the optical index of the waveguide, and $n_{\it eff}(\lambda)$ is the effective index of guided mode in the waveguide.

Consequently, when the wavelength increases, $\alpha(\lambda)$ increases, because the effective index of guided mode in the waveguide reduces due to delocalisation. In other words, the vertical component (along (Oz)) of the wave vector increases on entry into the structure 139.

At the same time, when the wavelength increases, the optical thickness of the gradient along (Oz) seen by the light reduces. This causes a reduction in the deviation of rays, $\theta(\lambda)$, related to the crossing through the index gradient structure 139. In particular we have $$\theta(\lambda) = \tan^{-1}\left(h * \frac{\lambda_0}{\lambda} * \frac{\delta n}{\delta x}\right),$$

where $$\frac{\delta n}{\delta x}$$

is the gradient along (Ox) of the average optical index in the index gradient structure 139.

Therefore the initial increase in the deviation at the entry into the structure 139, is compensated by the reduction of the deviation during the crossing through said structure. Thus, the total deviation remains approximately constant over a wide range of wavelengths.

The same phenomenon occurs when the light rays move in the opposite direction, for light injection into the waveguide.

It will be noted that optical coupling between the coupling device according to the invention and an optical fibre oriented along the normal to the substrate simply means that the following condition is satisfied:

$$\alpha(\lambda) + \theta(\lambda) = \frac{\pi}{2}.$$

Figure 2:
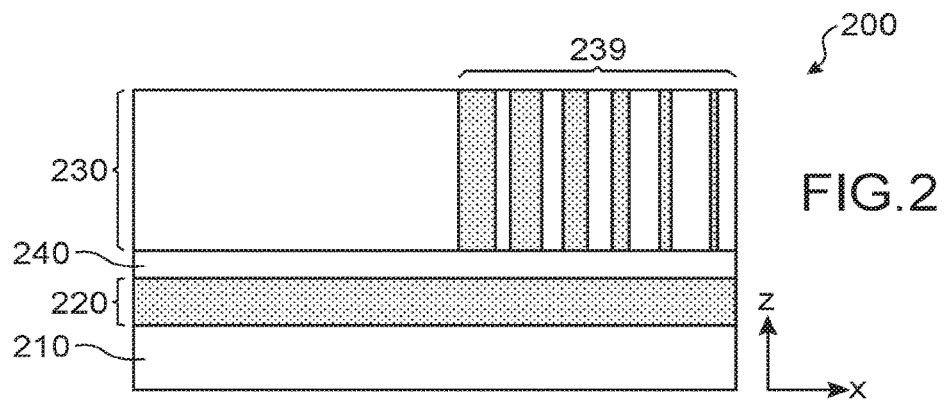
FIG. 2 diagrammatically illustrates a second embodiment of a coupling device according to the invention.

FIG. 2 diagrammatically illustrates a second embodiment of a coupling device 200 according to the invention.

The only difference between the coupling device 200 and the coupling device 100 is that the coupling device 200 also includes a spacer layer 240 placed between the guide stage 220 and the coupling stage 230, in direct physical contact with these two stages.

The spacer layer 240 has an optical index lower than that of the waveguide. Preferably, the spacer layer 240 is composed of the same material as the layer directly adjacent to the guide stage (in this case the substrate 210). In this case, the spacer layer 240 is composed of silica.

The thickness of the spacer layer 240, along the (Oz) axis, is less than the wavelength $\lambda_0$ guided in the waveguide. Light can thus propagate by evanescence through the spacer layer 240, between the coupling stage and the guide stage.

The spacer layer 240 makes it possible to control a leakage length of a light beam extracted from the waveguide, this leakage length determining the width of the beam extracted at the exit from the coupling device 200.

The same phenomenon occurs when the light rays move in the opposite direction, for light injection into the waveguide. The width of the extracted beam can thus be adapted to a mode size in the optical fibre, for extraction of the waveguide to an optical fibre as shown on FIG. 1B, and for injection of light from the optical fibre into the waveguide.

In practice, the size of the guided mode in the optical fibre is an input data.

It is required that this mode size should be equal to the leakage length, in the spacer layer 240. Therefore, a thickness of the spacer layer 240 is determined such that the required leakage length can be obtained.

The leakage length fixes a maximum value of the index gradient in the index gradient structure 239, since light needs to leak over this entire length. It is necessary to make sure that this gradient is sufficiently low so that the average optical index at each point on the index gradient structure 239 remains higher than $n_{\it eff}$ over the entire required leakage length, thus enabling leakage of light.

This maximum value of the gradient will preferably be chosen, so that the thickness of the index gradient structure along the (Oz) axis can be limited.

The thickness of the index gradient structure can then be adjusted to adapt the extraction angle to the inclination of an optical fibre as shown on FIG. 1B.

Figure 3A:
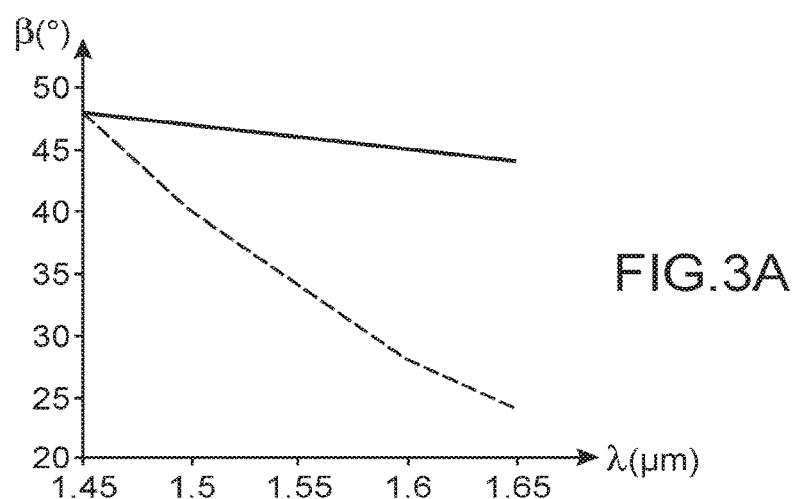
FIGS. 3A and 3B illustrate simulation results of a coupling implemented in the coupling device in FIG. 2.
Figure 3B:
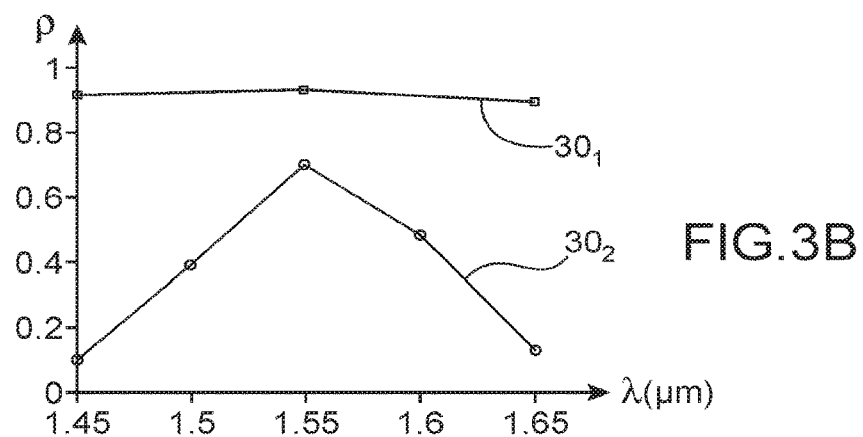

FIGS. 3A and 3B illustrate the simulation results of the operation of a coupling device like that shown on FIG. 2.

In this case, the central wavelength $\lambda_0$ is equal to 1.55 μm.

The distance d (see FIG. 1B) is equal to 200 nm.

The thickness of the spacer layer is 0.35 μm.

The thickness of the index gradient structure is 5 μm.

The length of the first regions varies linearly from a length of 50 nm to a length of 150 nm as the distance from the waveguide increases. Therefore the length of the second regions varies in the inverse direction, also linearly.

The coupled wavelength is made to vary around $\lambda_0$ from 1.45 μm to 1.65 μm, namely a spectral bandwidth of 200 nm.

On FIG. 3A, the extraction angle β, in angle degrees, is represented as a solid line as a function of the wavelength λ, in μm.

β remains approximately constant over the enter spectral band considered. In other words, achromatic operation of the coupling device according to the invention is observed, in this case on a 200 nm wide spectral band. Therefore the coupling device according to the invention enables coupling of a wide spectral band, in this case at least 200 nm wide, in the same direction in free space outside the guide stage.

As a comparison, the extraction angle as a function of the wavelength for a device according to prior art as described in the introduction is also represented. In this case the device according to prior art comprises a diffraction grating composed of half silicon and half silica, with a pitch of 0.9 μm. It also comprises a reflection mirror, at an optical distance equal to a quarter wave from the grating.

In the device according to prior art, the extraction angle varies strongly as a function of the wavelength (variation of the extraction angle equal to about 10° for a variation of the wavelength equal to about 50 nm).

Therefore the performances of the invention in terms of stability of the extraction angle as a function of the wavelength are significantly better than in prior art.

Like the wavelength, polarisation influences the components of the light wave vector in the index gradient structure. Therefore the performances of the invention in terms of stability of the extraction angle as a function of the polarisation are also significantly better than in prior art. The coupling device is insensitive to polarisation.

The same advantages are obtained when the light rays move in the opposite direction, for light injection into the waveguide.

Simulations have also shown that a linear variation of the lengths of the second regions of the index gradient structure can give a quasi-Gaussian spatial extraction profile of mode, and therefore a good mode adaptation with an optical fibre.

More generally, a linear variation of the proportion of material of the second regions in a cubic volume V(x,y,z) as a function of x, makes it possible to obtain a quasi-Gaussian spatial extraction profile of mode, and therefore good mode adaptation with an optical fibre.

FIG. 3B includes a representation of the efficiency of coupling between the coupling device according to the invention and an optical fibre, as a function of the wavelength in μm (curve $30_1$). The extraction angle is fixed.

The coupling ratio remains approximately constant, equal to a high value (about 90%), over the entire spectral band considered. Therefore the coupling device according to the invention enables efficient coupling with a Gaussian mode optical fibre. This coupling also remains efficient over a wide spectral band, in this case at least 200 nm wide, As a comparison, the coupling ratio as a function of the wavelength is also represented for the device according to prior art described above (curve $30_2$). In such a device, the extraction profile is exponential, and therefore badly adapted to the Gaussian profile of the mode in the optical fibre. A lower maximum coupling ratio is observed (not more than 70%), and that varies strongly as a function of the wavelength.

Therefore the performances of the invention in terms of the efficiency of coupling with a Gaussian mode optical fibre are significantly better than in prior art. The improvement is particularly large when the variation of the proportion of material of the second regions in a cubic volume V(x,y,z), as a function of x, approaches a linear variation. In particular, the linear coefficient defining said variation of lengths determines the size of the Gaussian envelope at the exit from the coupling device according to the invention.

It is assumed that the Gaussian extraction profile is the result of the fact that the linear variation of the proportion of material of the second regions does not result in a strictly linear variation of the value of the average optical index.

In particular, according to equation (4) above, a linear variation of $f_{n1}$ does not result in a linear variation of $n_{moy}$. Therefore deviation of light in the index gradient structure is accompanied by a slight defocussing effect.

Figure 4:
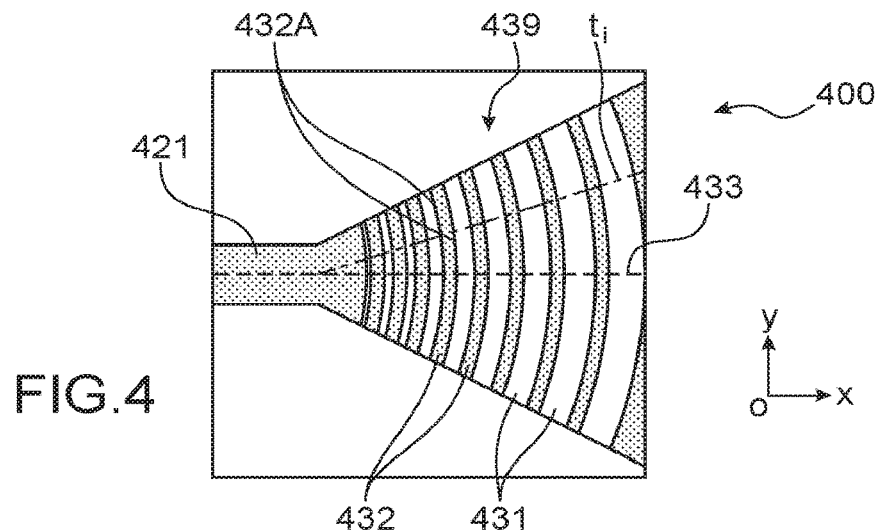
FIG. 4 diagrammatically illustrates a third embodiment of a coupling device according to the invention.

FIG. 4 diagrammatically illustrates a third embodiment of a coupling device 400 according to the invention.

In this case, the guide stage does not include a pad, and the index gradient structure 43A is superposed with the taper, along the (Oz) axis. In this case, the taper is shorter than in the previous case in FIGS. 1A to 1C (it is not adiabatic, and allows light to diverge along the Oy axis).

In FIG. 4, a diagrammatic view of the coupling device 400 is represented, in a plane parallel to the (xOy) plane. FIG. 4 shows the waveguide 421, the lateral edges of the taper, under the index gradient structure, and the index gradient structure 439 composed of an alternation of first regions 431 and second regions 432.

The cross-section of the index gradient structure 439 is the same as the cross-section of the taper, in planes parallel to (xOy).

The second regions 432 have faces 432A, called entry and exit faces. During operation, the light beam coupled by the coupling device 400 passes through these faces. These faces extend along (Oz), and exhibit a curvature defined in planes parallel to (xOy). In this case, said curvature corresponds to a portion of an ellipse.

In other words, in this case the first and second regions are delimited by planes that extend along (Oz), and have a curvature defined in planes parallel to (xOy).

The curvature is adapted to the shape of the wavefront of the beam propagating in the index gradient structure, when it is superposed on a non-adiabatic taper in which light diverges. In other words, the shape of the first and second regions of the index gradient structure is adapted to the divergent wave front at the exit from the waveguide.

In this case, the average optical index in the index gradient structure varies monotonously and decreases with increasing distance from the waveguide, along each of the axes $t_i$ corresponding to the orthogonal projection, in a plane (xOy) parallel to the plane of the substrate, of one of the rays of the divergent beam propagating in the index gradient structure.

Figure 5:
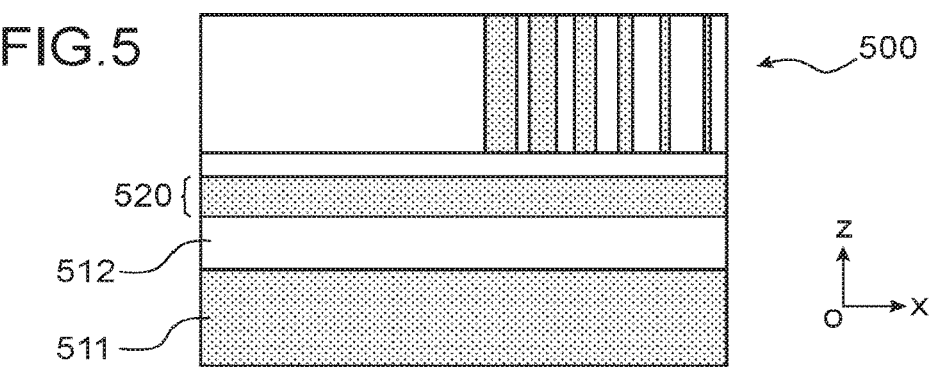
FIG. 5 diagrammatically illustrates a variant of the device in FIG. 2.

FIG. 5 diagrammatically illustrates a variant in which the coupling device 500 is obtained from an "SOI" stack.

The SOI (silicon on insulator) stack comprises a silica insulating layer 512 intercalated between a silicon substrate 511 and an upper silicon layer.

In this case, the upper silicon layer is etched to form silicon elements of the guide stage. Silicon elements of the coupling stage can be made in a second SOI stack added on by bonding, or in a deposited layer of amorphous silicon.

As a variant, the upper silicon layer can be etched to form silicon elements for the guide stage and for the coupling stage, so as to make a coupling device as shown on FIGS. 1A to 1C.

In order for a light beam to be sufficiently curved as it passes into the optical coupler according to the invention, it must pass through a thickness of the optical coupler equal to at least $\lambda_0/n_{eff}$, the thickness being defined along (Oz) and $n_{eff}$ being the effective index of guided mode in the waveguide.

Therefore in the embodiments in FIGS. 1A to 5, the thickness H along (Oz) of the index gradient structure and the optical coupler satisfies the following relation:

$$H \geq \frac{\lambda_0}{n_{\text{eff}}} \quad (5)$$

For the reasons mentioned above, this inequality can be approximated by $$H \geq \frac{\lambda_0}{n_c},$$

in which $n_c$ is the optical index of the waveguide 121.

For coupling at 1550 nm, the height H is about 5 μm, while the length along (Ox) of the first regions of the index gradient structure can be reduced for example to 50 nm, giving a ratio of 100 between these two magnitudes.

During fabrication, the index gradient structure can be made by etching trenches in a solid layer. The ratio 100 mentioned above can then cause technological difficulties.

Figure 6:
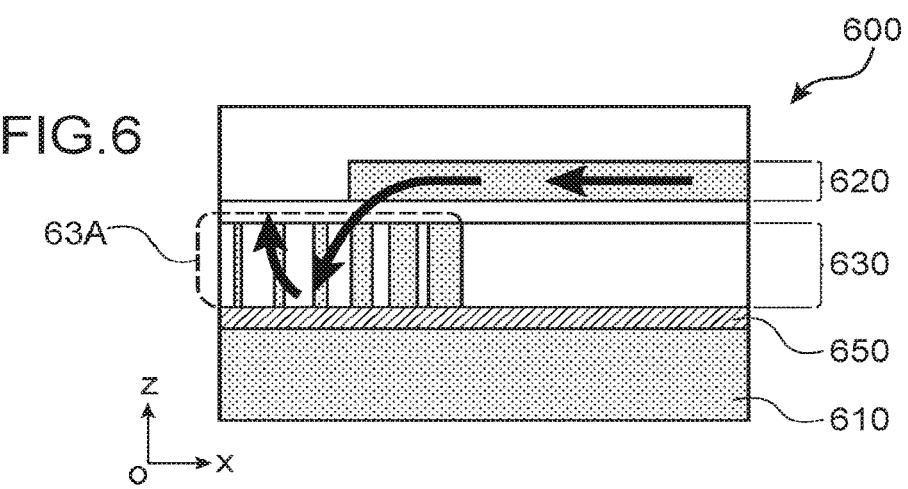

FIGS. 6 and 7 illustrate two embodiments that can reduce this ratio, by reducing the thickness of the optical coupler.

The coupling device 600 in FIG. 6 comprises a first reflector 650 that extends in a plane parallel to (xOy), on the side of the optical coupler opposite the guide stage 620.

The reflector 650 reflects the rays around $\lambda_0$.

It may for example be composed of a single layer of metal.

FIG. 6 shows the light path in the optical coupler 63A. Due to the reflector 650, light passes through the optical coupler 63A twice in the direction of the thickness. Therefore the apparent thickness of the optical coupler 63A is twice its real thickness. Light can thus pass through a thickness of the optical coupler equal to at least $$\frac{\lambda_0}{n_{\text{eff}}},$$

with a smaller real thickness of said coupler.

This embodiment can be made from an SOI stack turned over after completion of the guide stage, the coupling stage and deposition of a reflecting layer. The substrate 610 is then a silicon substrate that was for example bonded above the reflecting layer, and distinct from the silicon substrate of the SOI stack (removed at the end of the process). The coupling stage 630 then extends between the guide stage 620 and the substrate 610.

The optical coupler 63A projects along the (Ox) axis, relative to the high index structure of the guide stage. This thus avoids the generation of parasite reflections.

The coupling device 700 in FIG. 7 also comprises a second reflector 751 reflecting around $\lambda_0$ and located in a plane parallel to (xOy), on the same side of the optical coupler as the guide stage 720. Due to the reflectors 750 and 751, arranged on each side of the optical coupler 73A, light passes at least three times through the optical coupler 73A in the direction of the thickness. Therefore the apparent thickness of the optical coupler 73A is at least three times its real thickness. Light can thus pass through a thickness of the optical coupler equal to at least $\lambda_0/n_{\text{eff}}$ with a much smaller real thickness of said coupler.

On the other hand, in the embodiments in FIGS. 1A to 5, the coupling device according to the invention does not have a reflector located facing the optical coupler, with its reflecting face located on the side of the optical coupler.

In FIG. 7, the optical coupler 73A is composed of several index gradient structures 739, juxtaposed along the (Ox) axis. A large index gradient in the optical coupler can thus be combined with a long length of the optical coupler along which the beam makes several backwards and forwards travelling between the first reflector 750 and the second reflector 751.

As a variant, the optical coupler is composed of a single index gradient structure with a smaller index gradient.

We will now refer to FIGS. 8A and 8B to illustrate steps in a fabrication method by which a high ratio between the height of the optical coupler and the length of the first regions of the index gradient structure can be easily obtained.

The concept is to make the optical coupler in several layers, superposed along the (Oz) axis.

The first step illustrated in FIG. 8A is to deposit a support layer 860, in this case made of amorphous silicon, above the substrate 810.

Through openings are then etched in the support layer 860 to define a first series of second regions 832 according to the invention, and the etched openings are filled by an infill material, in this case silica, that is planarized to form a first series of first regions 831 according to the invention (see FIG. 8B).

The steps in FIGS. 8A and 8B can be repeated several times to obtain a multi-layer structure with the required thickness, composed of several superposed series of first and second regions with monotonically varying lengths.

This method can achieve a good aspect ratio between the etching depth and the section of the etched openings, during each etching step.

In this case, the support layer is composed of the material of the second regions, and the infill material is the material of the first regions. The inverse is also possible.

FIG. 9 illustrates the coupling device 900 obtained with such a method. The optical coupler 93A is composed of a plurality of layers 935 superposed along the (Oz) axis, each comprising a series of first and second regions according to the invention.

The different layers 935 have the same index gradient. They are all preferably identical. On the other hand, they are not perfectly aligned with each other along (Ox), since the invention makes use to the first order of the gradient of the local value of an optical index. The alignment tolerance is for example of the order of a few pseudo-periods, in which the pseudo-period is the length along (Ox) of a second region and an adjacent first region.

This embodiment can be combined with the use of one or several reflectors, as illustrated in FIGS. 6 and 7.

The basic concept of the invention consists of making a coupling device with an index gradient structure in which the average optical index as defined above varies monotonously along each of the axes $t_i$ corresponding to the orthogonal projection, in a plane (xOy) parallel to the plane of the substrate, of one of the rays of the beam propagating in the index gradient structure.

The variation decreases monotonously as the distance from the waveguide increases.

The man skilled in the art will be capable of making many different geometries, other than those described above, to satisfy this condition.

Figure 10A:
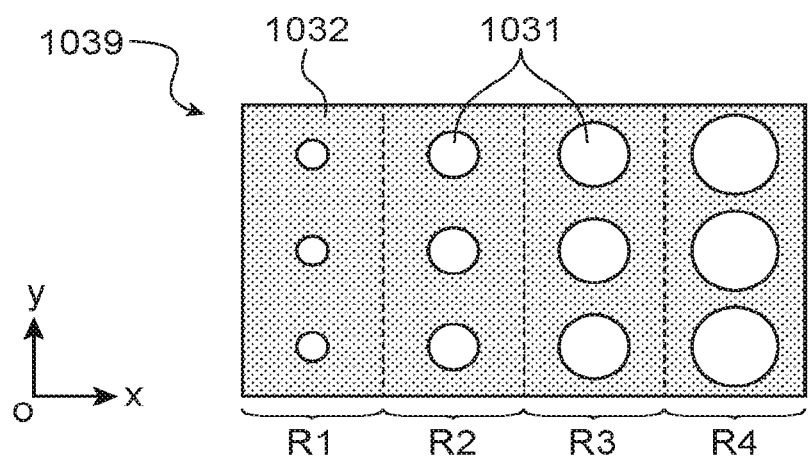
FIGS. 10A and 10B are top views diagrammatically illustrating other embodiments of an index gradient structure according to the invention.
Figure 10B:
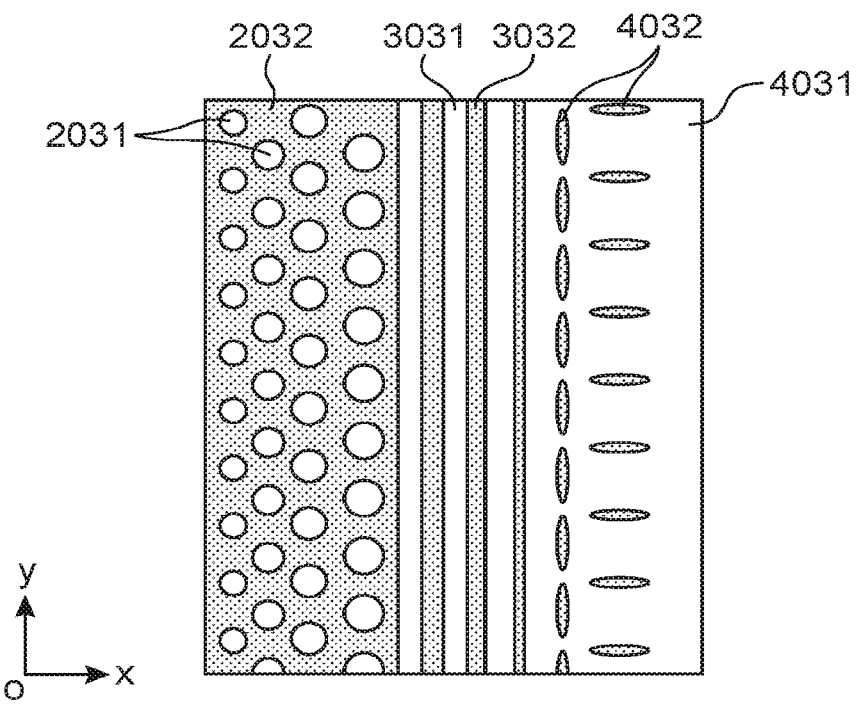

FIGS. 10A and 10B illustrate two examples.

In the embodiment of FIG. 10A, the index gradient structure 1039 is composed of a solid layer made of a high index structure (second region 1032), in which inclusions of a low index material extend (first regions 1031).

The inclusions are in the form of a cylinder of revolution, with the same height along (Oz) as the index gradient structure 1039. The diameter of the cylinders varies monotonously along the (Oz) axis.

In this case, the cylinders are distributed in a plurality of regions R1, R2, R3, R4, each region being associated with a given value of the cylinder diameter. Each region R1, R2, R3, R4 is in the form of a rectangular parallelepiped, with a length less than or equal to $$\frac{\lambda_0}{2*n_{eff}}.$$

It can be considered that each of these regions R1, R2, R3, R4 is the equivalent of a pseudo-period of the index gradient structure described with reference to FIGS. 1A to 1C.

In the embodiment in FIG. 10B, the variation of the average optical index along the (Ox) axis, in planes parallel to the (xOy) plane, is obtained by combining:
  inclusions 2031 in the form of a cylinder of revolution made of a low index material, in a high index layer 2032;
  rectangular parallelepipeds 3031, 3032 alternatively made of a low index and a high index material, with variable lengths; and
  cylindrical inclusions 4032 with oval bases made of a high index material, in a low index layer 4031;

The invention is not limited to the examples detailed above, and many variants can be used without going outside the framework of the invention.

In the examples described above, the index gradient structure is entirely composed of first and second materials. As a variant, it can include inclusions of a third material.

A device adapted to coupling at 1550 nm and composed of silicon and silica has been described above. As a variant, the coupling device may be composed of silicon nitride (SiN) and silica, for coupling at 1550 nm. According to another variant, the coupling device may be composed of SiGe and Si, for coupling in the medium infrared, at a wavelength between 3 µm and 12 µm. The dimensions of the index gradient structure are then the dimensions for coupling at 1550 nm multiplied by a factor of between 2 and 6.

The invention claimed is:

1. A coupling device comprising a substrate in or on which the following are integrated:
  a waveguide capable of guiding a light beam centred on a central wavelength $\lambda_0$;
  an optical injection and/or extraction coupler;
  a guide stage comprising the waveguide and a coupling stage comprising the optical coupler, superposed one on the other, wherein the optical coupler is composed of at least one index gradient structure, and wherein the average optical index in the index gradient structure varies monotonously, decreasing in planes parallel to the plane of the substrate, as the distance from the waveguide increases, the average optical index being defined as being an average value of the optical index in a cubic volume (V(x,y,z)) with a side dimension equal to:

$$\frac{\lambda_0}{2*n_{eff}}$$

wherein $n_{eff}$ is the effective index of guided mode in the waveguide; said average value being a root mean square of the optical indexes of materials forming said cubic volume, weighted by the volume proportion of each of these materials in the cubic volume.

2. The coupling device according to claim 1, wherein the apparent thickness of the optical coupler is more than or equal to $\lambda_0/n_{eff}$, the apparent thickness being defined along an axis orthogonal to the plane of the substrate and designating a cumulated thickness through which the light beam passes, wherein said light beam comes from the waveguide or arrives into the waveguide, said light beam being centred on the central wavelength $\lambda_0$.

3. The coupling device according to claim 1, wherein the thickness of the optical coupler is more than or equal to $\lambda_0/n_{eff}$, the thickness being defined along an axis orthogonal to the plane of the substrate.

4. The coupling device according to claim 1, comprising at least one reflector, positioned facing the optical coupler.

5. The coupling device according to claim 1, wherein:
  the index gradient structure is composed of at least one first region and at least one second region, composed of a first material with a first optical index, and a second material with a second optical index greater than the first optical index respectively; and
  the proportion of the second material in said cubic volume (V(x,y,z)) varies monotonously, decreasing in planes parallel to the plane of the substrate, as the distance from the waveguide increases.

6. The coupling device according to claim 5, wherein the proportion of the second material in said cubic volume (V(x,y,z)) varies also linearly in planes parallel to the plane of the substrate, as the distance from the waveguide increases.

7. The coupling device according to claim 5, wherein:
  the index gradient structure is composed of an alternation of said first and second regions, distributed one after the other along an axis parallel to the longitudinal axis of the waveguide;
  a centre-to-centre distance between two neighbouring second regions, along an axis parallel to the longitudinal axis of the waveguide, is less than or equal to $$\frac{\lambda_0}{2*n_{eff}}.$$

8. The coupling device according to claim 7, wherein each of said first and second regions is in the form of a rectangular parallelepiped.

9. The coupling device according to claim 8, wherein:
  the guide stage comprises the waveguide, a taper the width of which decreases with decreasing distance from the waveguide, and a pad with constant width, juxtaposed along the longitudinal axis of the waveguide; and
  the optical coupler and the pad are superposed together.

10. The coupling device according to claim 7, wherein:
  the guide stage comprises the waveguide and a taper the width of which decreases with decreasing distance from the waveguide, juxtaposed along the longitudinal axis of the waveguide;

the optical coupler and the taper are superposed together; and said first and second regions are delimited relative to each other by planes orthogonal to the plane of the substrate, with a curved section in planes parallel to the plane of the substrate.

11. The coupling device according to claim 1, comprising a spacer layer, with optical index less than that of the waveguide, intercalated between the guide stage and the optical coupler.

12. The coupling device according to claim 1, wherein the index gradient structure is invariable along its thickness, the thickness being defined along an axis orthogonal to the plane of the substrate.

13. The coupling device according to claim 1, wherein:
the index gradient structure is composed of a plurality of layers, identical to each other and superposed along an axis orthogonal to the plane of the substrate;
each of said layers is invariable along its thickness, the thickness being defined along an axis orthogonal to the plane of the substrate; and
said layers are misaligned relative to each other.

14. The coupling device according to claim 1, wherein the optical coupler comprises several index gradient structures, juxtaposed one after the other along an axis parallel to the longitudinal axis of the waveguide.

15. A method of fabrication of a coupling device according to claim 1, wherein at least one index gradient structure is made using several successive cycles as follows:
deposit a support layer;
etch through openings in the support layer; then
fill the etched openings with an infill material, and planarize.

* * * * *